United States Patent [19]

Wilson

[11] Patent Number: 4,485,676

[45] Date of Patent: Dec. 4, 1984

[54] MOVEMENT SUPPORT BRACKET FOR A PRESSURE GAUGE

[75] Inventor: James S. Wilson, Thomaston, Conn.

[73] Assignee: Dresser Industries, Inc., Dallas, Tex.

[21] Appl. No.: 472,698

[22] Filed: Mar. 7, 1983

[51] Int. Cl.³ .............................................. G01L 7/04
[52] U.S. Cl. ........................................ 73/741; 73/756; 73/432 A
[58] Field of Search ................ 73/741, 742, 743, 756, 73/732–739, 432 A, 386, 387, 715, 716, 729

[56] References Cited

U.S. PATENT DOCUMENTS

| | | | |
|---|---|---|---|
| 3,495,462 | 2/1970 | Knapp | 73/387 |
| 3,867,841 | 2/1975 | Widlund | 73/432 A |
| 4,168,631 | 9/1979 | Wetterhorn et al. | 73/741 |
| 4,444,057 | 4/1984 | Witterhorn | 73/739 |

Primary Examiner—Donald O. Woodiel
Attorney, Agent, or Firm—Daniel Rubin

[57] ABSTRACT

A pressure gauge in which the mechanical movement that drives the pointer from displacement motion of the Bourdon tube is supported by a bracket of Y-shaped configuration. Comprising the bracket is an integral folded composition defining spreadable support arms joined to an elongated tab adapted for connecting the bracket to the gauge mechanism.

7 Claims, 6 Drawing Figures

U.S. Patent  Dec. 4, 1984  4,485,676
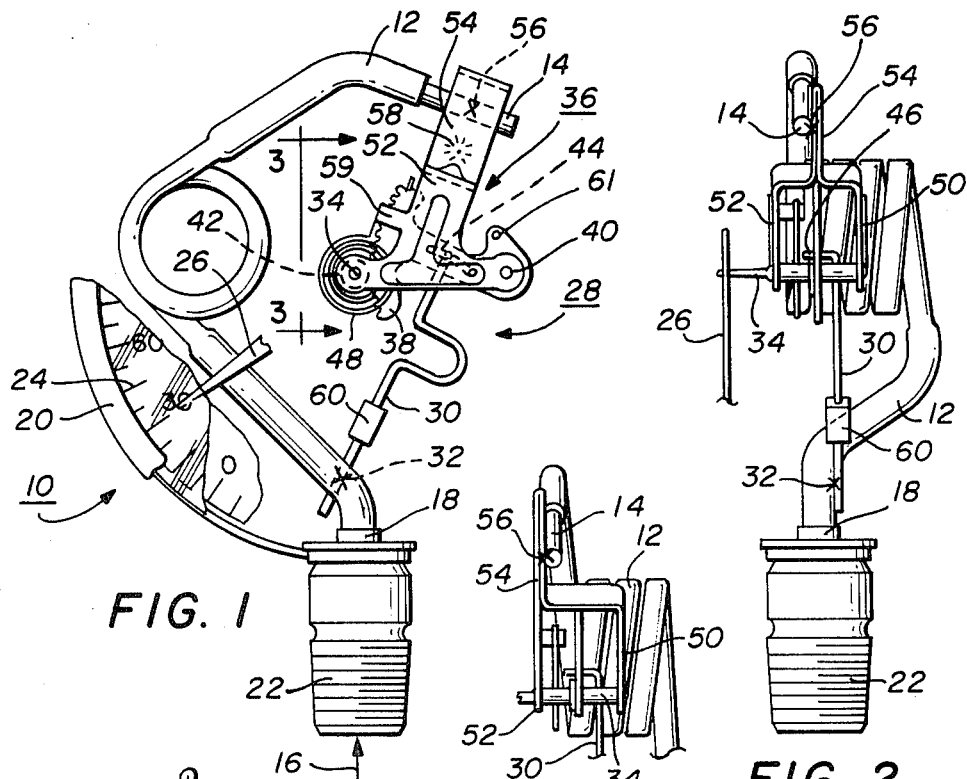
FIG. 1
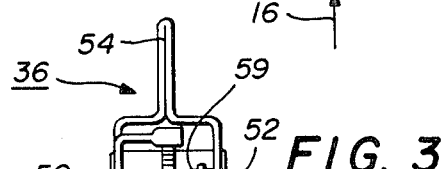
FIG. 5
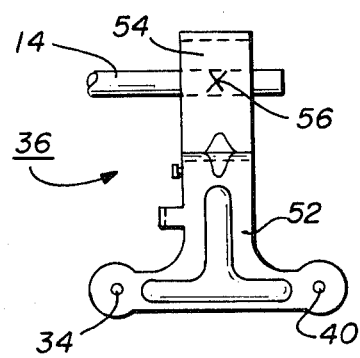
FIG. 3
FIG. 4
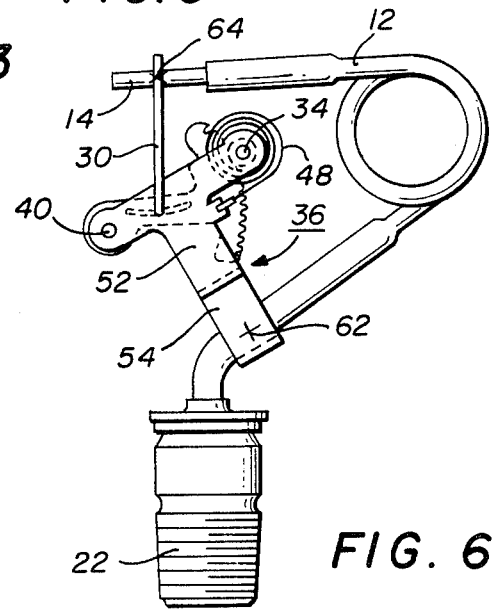
FIG. 2
FIG. 6

4,485,676

MOVEMENT SUPPORT BRACKET FOR A PRESSURE GAUGE

TECHNICAL FIELD

The field of art to which the invention pertains comprises the art of measuring and testing as related to fluid pressure gauges.

BACKGROUND OF THE INVENTION

Pressure gauges enjoy very extensive commercial and industrial use, and are consequently regarded as high production items. Because of such wide use, they are supplied by a plurality of manufacturers and sold in very price conscious competition. Each manufacturer instinctively strives to reduce product costs by improvements, however marginal, which reduce labor and/or materials that can contribute to cost savings in the end product.

Disclosed in U.S. Pat. Nos. 4,168,631 and 4,240,298 is a pressure gauge in which the mechanical movement for driving the pointer from displacement motion of the Bourdon tube is supported via a U-shaped bracket secured to the gauge mechanism, generally comprising the free end of the Bourdon tube. While this arrangement in the finished product has performed satisfactorily, it has encountered manufacturing problems posed by the difficulties which it presents in obstructing welding electrode accessibility for attaching the bracket to the tip of the Bourdon tube. Incident thereto, by virtue of the electrode interference it presents, has been an inability in the course of production to preassemble the movement onto the bracket prior to welding. While seemingly minor, this prior bracket structure has therefore resulted in unnecessary expense in the production manufacture of such gauges, and despite recognition of the problem, a solution therefor has not heretofore been known.

SUMMARY OF THE INVENTION

This invention relates to pressure gauges and more specifically to an improved apparatus for securing the drive movement to the gauge mechanism. This is achieved in accordance with the invention by means of a bracket having a more or less Y-shaped configuration comprised of spreadable support arms joined with an integral longitudinal support tab extending in a direction away from the support arms. The entire bracket is formed of foldover integral stock in which the foldover tab defines the support surface for effecting a welded connection to the gauge mechanism. By virtue of its removed location from the supported movement, the tab affords compatability with subsequent use of the welding electrode while preassembly of the movement to the bracket prior to welding is rendered possible.

It is therefore an object of the invention to effect a novel support bracket for securing the mechanical movement of a pressure gauge to the gauge mechanism.

It is a further object of the invention to effect the previous object with a structure affording increased efficiency of manufacture as compared to similar purpose structures of the prior art.

DESCRIPTION OF THE DRAWINGS

FIG. 1 is a fragmentary front elevation of a pressure gauge utilizing the support bracket of the invention;

FIG. 2 is a right side elevation of FIG. 1;

FIG. 3 is a partial left side elevation as seen substantially along the lines 3—3 of FIG. 1;

FIG. 4 is an alternative embodiment for the support bracket of FIG. 1;

FIG. 5 is a further alternative embodiment for the support bracket of FIG. 1; and FIG. 6 illustrates an alternative mounting of the support bracket from that illustrated in FIG. 1.

Referring initially to FIGS. 1–3, there is disclosed a pressure gauge 10 of a type generally disclosed in U.S. Pat. No. 4,237,738 in which a Bourdon tube 12 having a free end 14 is adapted for displacement in correlation to the values of pressure 16 received at fixed inlet 18. Inlet 18 is adapted for installation in a gauge housing 20 which includes a socket 22, a dial plate 24 and a pointer 26 that is rotatably displaced opposite registrations on dial 24 in response to pressure changes received at inlet 18 through socket 22. Supported from tube end 14 is a floating movement 28 of a type generally disclosed in U.S. Pat. No. 4,055,085 to R. H. Wetterhorn that in cooperation with a wire actuator 30 welded at 32 to the Bourdon tube functions to drive pointer shaft 34.

Comprising movement 28 is a support bracket 36 in accordance with the invention hereof as will be described below, supporting a segment gear 38 for pivotal movement about shaft 40 and engaging a pinion 42 secured on pointer shaft 34. Longitudinal elongated slot 44 in the face of segment gear 38 receives the distal end 46 of wire actuator 30 so as to enable pivotal motion of the segment gear in response to pressure change displacement transmitted to the bracket from the Bourdon tube free end 14. A pretensioned hair spring 48 functions to eliminate slack that might otherwise be encountered in operation of movement 28.

Support bracket 36 of the invention is comprised of an integral frame of hard, thin sectioned metal such as brass folded into the Y shape thereof. Defining the individual support portions of the bracket are spaced apart side legs 50 and 52 joined with elongated foldover center tab 54 extending parallel and longitudinally in a direction away from the side legs. As can be appreciated, this configuration of bracket 36 affords increased flexibility at the lower portion of side legs 50 and 52 for snap-in positioning of the operative components therebetween. At the same time, tab 54 by virtue of its flatness and location removed from the U portion of the bracket provides enhanced suitability for mounting via weld 56 to end 14 of the Bourdon tube. Moreover, a spot weld 58 when applied between the contiguous overlapping surfaces of tab 54 increases the post-assembly rigidity of the side legs 50 and 52 toward retention of movement 28.

Positioned mounting of bracket 36 is preferably in accordance with the disclosure of U.S. Pat. No. 4,168,631, while a clamp 60 on actuator wire 30 enables calibration in accordance with the disclosure of U.S. Pat. No. 4,361,046. An integral tab 59 provides for a grounded connection of hairspring 48, while a laterally outward extending pin 61 may optionally be utilized to act as an overload stop.

In the embodiment of FIG. 4, tab 54 extends in a direction generally perpendicular to the plane extending between the axes of pivots 34 and 40 as compared to the oblique angle thereof in the embodiment of FIG. 1. Likewise, the embodiment of FIG. 5 includes a tab 54 located to one side as to be a co-planar extension of side leg 52 in contrast to the more central location of the tab in the FIG. 1 embodiment. Finally, FIG. 6 illustrates an inverted arrangement utilizing bracket 36 in which tab 54 is welded at 62 to Bourdon tube 12 near the fixed end thereof, while actuator wire 30 is secured to the free end 14 of the Bourdon tube by a weld at 64.

By the above description there is disclosed a novel bracket construction for operably supporting the mechanical movement of a pressure gauge between the free end of the Bourdon tube and the output pointer shaft. By means of a relatively simple construction, utilizing an integral metal of folded configuration that results in a support tab removed from the operating mechanism of the movement, securing the bracket to the gauge mechanism is substantially simplified while enabling preassembly of the movement prior to it being secured. The savings in assembly time associated with the manufacture of such gauges results in a significant cost reduction to the manufacturer which in turn enhances the competitive sales position for such gauges.

Since many changes could be made in the above construction, and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In a pressure gauge including a mechanical movement for driving a pointer from displacement motion of a condition responsive element, said movement including input means adapted to receive displacement motion from said condition responsive element, output means operably coacting with said input means for effecting an output displacement correlated to the input motion received by said input means and a frame supporting said movement and including generally parallel side legs spreadable to receive and retain first and second spaced apart rotatable shafts of said movement, each of said shafts being transversely supported in a snap-in relation directly journalled between said side legs, the improvement comprising said frame being of a generally Y-shape configuration of integral composition including said side legs and a foldover elongated tab joined with said side legs as an integral extension thereof from the vicinity of their inward ends, said tab extending in a direction away from said side legs to provide a distended surface sufficiently removed from the movement supported between said side legs to enable securing the frame and the supported movement in operating relation within said gauge.

2. In a pressure gauge according to claim 1 in which said condition responsive element comprises a Bourdon tube and said tab is secured to said Bourdon tube for supporting the movement in said operating relation.

3. In a pressure gauge according to claim 2 in which the foldover of said tab comprises overlapping portions of said frame composition and there is included means securing said overlapping portions together at an intermediate longitudinal location of said tab.

4. In a pressure gauge according to claim 2 in which the composition of said frame comprises a hard, thin sectioned metal.

5. In a pressure gauge according to claim 4 in which said tab extends generally co-planar with one of said side legs.

6. In a pressure gauge according to claim 4 in which said tab in the side profile of said frame extends in a direction generally normal to a plane joining the axes of said rotatable shafts.

7. In a pressure gauge according to claim 4 in which said tab in the side profile of said frame extends in a direction non-perpendicular to a plane joining the axes of said rotatable shafts.

* * * * *